United States Patent
Wang et al.

(10) Patent No.: US 11,134,237 B2
(45) Date of Patent: Sep. 28, 2021

(54) THREE-DIMENSIONAL DISPLAY SYSTEM AND METHOD

(71) Applicants: BOE TECHNOLOGY GROUP CO., LTD., Beijing (CN); Beijing BOE Display Technology Co., Ltd., Beijing (CN)

(72) Inventors: Yanfeng Wang, Beijing (CN); Xue Dong, Beijing (CN); Dan Wang, Beijing (CN); Yun Qiu, Beijing (CN); Yuanxin Du, Beijing (CN); Zhenhua Lv, Beijing (CN); Xiaoling Xu, Beijing (CN); Zhidong Wang, Beijing (CN); Weipin Hu, Beijing (CN); Congcong Wei, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 763 days.

(21) Appl. No.: 15/776,184

(22) PCT Filed: Oct. 19, 2017

(86) PCT No.: PCT/CN2017/106850
§ 371 (c)(1),
(2) Date: May 15, 2018

(87) PCT Pub. No.: WO2018/161583
PCT Pub. Date: Sep. 13, 2018

(65) Prior Publication Data
US 2021/0176451 A1    Jun. 10, 2021

(30) Foreign Application Priority Data
Mar. 6, 2017 (CN) .......... 201710128354.8

(51) Int. Cl.
H04N 13/32 (2018.01)
H04N 13/337 (2018.01)
G02B 30/25 (2020.01)

(52) U.S. Cl.
CPC ........... *H04N 13/337* (2018.05); *H04N 13/32* (2018.05); *G02B 30/25* (2020.01)

(58) Field of Classification Search
USPC ........................................... 348/51
See application file for complete search history.

(56) References Cited

U.S. PATENT DOCUMENTS 8,941,787 B2   1/2015  Lee et al.
2012/0112218 A1   5/2012  Teng et al.
(Continued)

FOREIGN PATENT DOCUMENTS

CN    101752472 A    6/2010
CN    102116939 A    7/2011
(Continued)

OTHER PUBLICATIONS

Search Report and Written Opinion for International Application No. PCT/CN2017/106850 dated Jan. 18, 2018.
(Continued)

*Primary Examiner* — Patricia I Young
(74) *Attorney, Agent, or Firm* — Calfee, Halter & Griswold LLP

(57) ABSTRACT

A three-dimensional display system includes: an LED array and a light control layer disposed on a base substrate; wherein the LED array is used to form polarized lights of different polarization directions; the light control layer is used to control a light emission order of the polarized lights of different polarization directions.

18 Claims, 5 Drawing Sheets

(56) References Cited

U.S. PATENT DOCUMENTS

2014/0146251 A1    5/2014   Lee et al.
2017/0214906 A1*   7/2017   Yang .................... H04N 13/398

FOREIGN PATENT DOCUMENTS

| CN | 102263179 A | 11/2011 |
|---|---|---|
| CN | 102620179 A | 8/2012 |
| CN | 102736255 A | 10/2012 |
| CN | 102792468 A | 11/2012 |
| CN | 103513439 A | 1/2014 |
| CN | 105911709 A | 8/2016 |
| CN | 106842601 A | 6/2017 |
| JP | H1063119 A | 3/1998 |

OTHER PUBLICATIONS

First Office Action for Chinese Patent Application No. 201710128354.8 dated Sep. 19, 2018.

* cited by examiner

THREE-DIMENSIONAL DISPLAY SYSTEM AND METHOD

CROSS REFERENCE

The present application is based on International Application No. PCT/CN2017/106850, filed on Oct. 19, 2017, which is based upon and claims priority to Chinese Patent Application No. 201710128354.8, filed on Mar. 6, 2017, and the entire contents thereof are incorporated herein by reference.

TECHNICAL FIELD

The present disclosure relates to the field of display technology, and in particular, to a three-dimensional display system and method.

BACKGROUND

With the rapid development of science and technology, the display industry has experienced technological advancement from black-and-white to color and from high-definition to 3D (Three Dimensions). Nowadays, people can enjoy the immersive three-dimensionality brought by the 3D display. The principle of the 3D display is to make images viewed by the viewer's left and right eyes different. The left eye sees an image corresponding to the left eye, and the right eye sees an image corresponding to the right eye, and then parallax occurs in the two eyes. People can see a three-dimensional image during the watching due to the presence of parallax.

The currently used 3D liquid crystal display technology adopts a progressive backlight scanning technology. That is, a backlight source includes a plurality of LED (Light Emitting Diode, light emitting diode) light strips, and the plurality of LED light strips is lit up one by one. According to the 3D liquid crystal display technology, an image is divided into two groups of pictures corresponding to the left and right eyes and displays them in a successively staggered manner, so that the left and right eyes can see corresponding pictures at a specified time. The liquid crystal panel displays the 3D image line by line. The light emitted by one of the LED light bars on the backlight source illuminates a region corresponding to the LED light bar on the liquid crystal panel after passing through the diffusion plate. The image data required to be displayed is input in the region, thus completing display of the image of this row. The display of the image of each frame needs to complete the display of all rows from top to bottom, which is called a single scan. However, after the display of the image of one row in the liquid crystal panel is completed, a next LED bar is lit to display the image of the next row, but at this time, the displayed image data of the one row still remains. When the next LED light bar is lit up, the light will not only illuminate the liquid crystal panel of the next row, but also some of the light will be scattered on the liquid crystal panels of the one row to make the maintained image data continue displaying, thus creating crosstalk. Since images of the left and right view fields of the 3D signal are displayed in a continuously staggered manner, and the two times of adjacent scans respectively display images of the left and right eyes, a viewer will also see the image of the right eye while seeing the image of the left eye, or see the image of the left eye while seeing the image of the right eye, which will result in crosstalk in views of the left and right eyes and affecting the 3D viewing effect.

It should be noted that, information disclosed in the above background portion is provided only for better understanding of the background of the present disclosure, and thus it may contain information that does not form the prior art known by those ordinary skilled in the art.

SUMMARY

The present disclosure provides a three-dimensional display system and method.

According to an aspect of the present disclosure, there is provided a three-dimensional display system, including an LED array and a light control layer disposed on a base substrate; wherein the LED array is used to form polarized lights of different polarization directions;

the light control layer is used to control a light emission order of the polarized lights of different polarization directions.

In an exemplary embodiment of the present disclosure, the light control layer controls the polarized light of one polarization direction during a period of time.

In an exemplary embodiment of the present disclosure, each LED in the LED array includes:

a p-n diode layer grown on a growth substrate;
an electrode layer disposed above the p-n diode layer;
a wire grid disposed above the p-n diode layer.

In an exemplary embodiment of the present disclosure, one LED has a plurality of wire grids of a plurality of polarization directions, and the plurality of polarization directions is different.

In an exemplary embodiment of the present disclosure, one LED has first wire grids of a first polarization direction and second wire grids of a second polarization direction.

In an exemplary embodiment of the present disclosure, the first polarization direction is perpendicular to the second polarization direction.

In an exemplary embodiment of the present disclosure, one LED has first wire grids of a first polarization direction, second wire grids of a second polarization direction, third wire grids of a third polarization direction, and fourth wire grids of a fourth polarization direction, wherein the first polarization direction, the second polarization direction, the third polarization direction, and the fourth polarization direction are all different.

In an exemplary embodiment of the present disclosure, the LED is a micro LED.

In an exemplary embodiment of the present disclosure, one LED has wire grids of one polarization direction, and the plurality of LEDs forms polarized lights of different polarization directions.

In an exemplary embodiment of the present disclosure, the light control layer includes a first substrate, a second substrate and liquid crystals disposed between the first substrate and the second substrate; wherein the light control layer is configured to transmit light in a power-on state and not transmit light in a power-off state.

In an exemplary embodiment of the present disclosure, the light control layer further includes a post spacer or a post spacer wall located in the liquid crystals, for controlling the liquid crystals in different regions.

According to an aspect of the present disclosure, there is provided a three-dimensional display method for the above three-dimensional display system, wherein the method includes:

forming polarized lights of different polarization directions through the LED array;

controlling a light emission order of the polarized lights of different polarization directions by using the light control layer.

In an exemplary embodiment of the present disclosure, the light control layer controls the polarized light of one polarization direction during a period of time.

In an exemplary embodiment of the present disclosure, the LED array includes a plurality of LEDs, one LED has first wire grids in a first polarization direction and second wire grids in a second polarization direction, the controlling a light emission order of the polarized lights in different polarization directions by using the light control layer includes:

in a picture of an n-th frame, turning on a light control layer corresponding to first wire grids of the first polarization direction to transmit polarized lights corresponding to the first polarization direction, and simultaneously turning off a light control layer corresponding to second wire grids of the second polarization direction to not transmit polarized lights corresponding to the second polarization direction;

in a picture of an (n+1)-th frame, turning off the light control layer corresponding to the first wire grids of the first polarization direction to not transmit polarized lights corresponding to the first polarization direction, and simultaneously turning on the light control layer corresponding to the second wire grids of the second polarization direction to transmit the polarized lights corresponding to the second polarization direction.

In an exemplary embodiment of the present disclosure, one LED has wire grids of one polarization direction, and a plurality of LEDs form polarized lights of different polarization directions.

Through the three-dimensional display system and method of the embodiments of the present disclosure, the LED array forms polarized lights of different polarization directions, and the light control layer controls a light emission order of the polarized lights of different polarization directions.

It is to be understood that both the foregoing general description and the following detailed description are exemplary and explanatory only and are not restrictive of the present disclosure.

BRIEF DESCRIPTION OF THE DRAWINGS

The accompanying drawings herein are incorporated in and constitute a part of this specification, illustrate embodiments consistent with the present disclosure, and together with the description serve to explain the principles of the present disclosure. Obviously, the drawings in the following description are merely some embodiments of the present disclosure, and those skilled in the art can also obtain other drawings based on these drawings without any creative labor.

DETAILED DESCRIPTION

Figure 1:
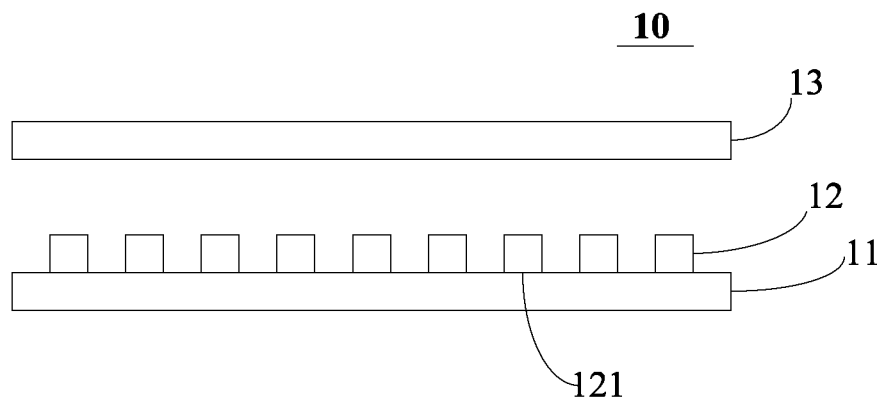
FIG. 1 shows a schematic structural view of a three-dimensional display system in an exemplary embodiment of the present disclosure.

Example embodiments will now be described more fully with reference to the accompanying drawings. However, the example embodiments may be embodied in many forms and should not be construed as limited to the embodiments set forth herein; rather, the features, structures, or characteristics described herein may be combined in any suitable manner in one or more embodiments. In the following description, numerous specific details are given to provide a thorough understanding of embodiments of the present disclosure. However, those skilled in the art will recognize that the technical solutions of the present disclosure may be practiced without one or more of the specific details, or may adopt other methods, components, devices, steps and the like.

It should be noted that in the drawings, the dimensions of layers and regions may be exaggerated for clarity of illustration. It will also be understood that when an element or layer is referred to as being "on" another element or layer, it can be directly on the other element or intervening layers may be present. In addition, it will be understood that when an element or layer is referred to as being "under" another element or layer, it can be directly under other elements, and there may be more than one intervening layer or element. In addition, it will also be understood that when a layer or element is referred to as being "between" two layers or two elements, it can be the only layer between the two layers or two elements, or more than one intervening layer or element can also be present. Similar reference numerals refer to similar elements throughout the description.

FIG. 1 shows a schematic structural view of a three-dimensional display system in an exemplary embodiment of the present disclosure. As shown in FIG. 1, the three-dimensional display system 10 includes an LED array 12 and a light control layer 13 disposed on a base substrate 11.

In the embodiment, the LED array 12 is used to form polarized lights of different polarization directions; the light control layer 13 is used to control a light emission order of the polarized lights of different polarization directions. In the embodiment of the present disclosures, the light control layer 13 is equivalent to a switch and can control the light emission order of the polarized lights of different polarization directions.

In an exemplary embodiment, the light control layer 13 may control to allow the polarized light of only one polarization direction to pass through during a period of time (for example, during time period of one frame), and block polarized lights of other polarization directions. However, the present disclosure is not limited to this.

In the embodiment, the above-mentioned base substrate 11 refers to a substrate structure in an intermediate state in which an LED device is to be manufactured, which may be a substrate structure of glass or other material, or may also be a substrate structure where devices such as thin film transistors (TFTs) have been manufactured and formed. The present disclosure is not limited to this.

In the following, various parts of the three-dimensional display system in the present exemplary embodiment will be described in more detail.

Continuing to refer to FIG. 1, the LED array 12 may include a plurality of LEDs 121.

Figure 2:
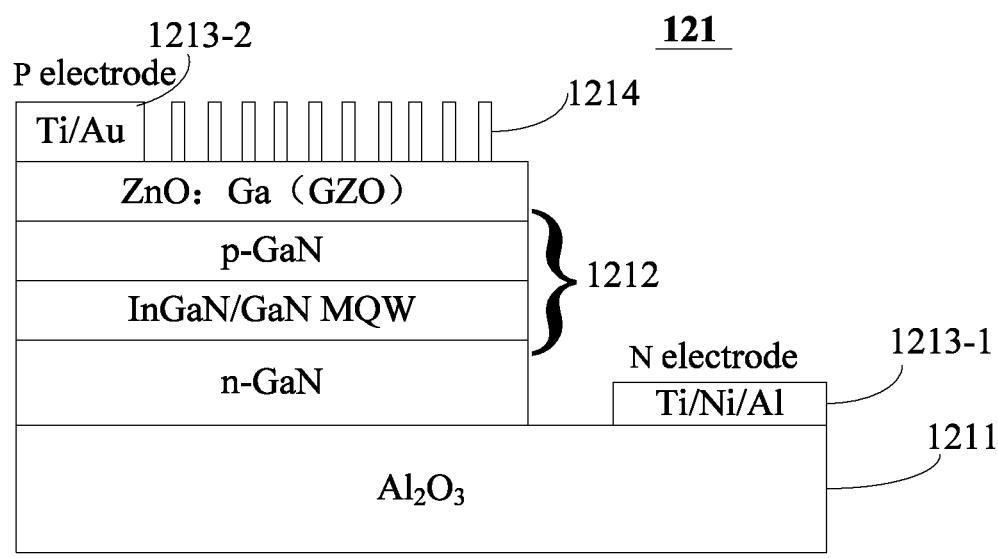
FIG. 2 shows a schematic structural diagram of an LED in an exemplary embodiment of the present disclosure.

FIG. 2 shows a schematic structural diagram of an LED in an exemplary embodiment of the present disclosure. In the embodiment, each LED 121 may include: a p-n diode layer 1212 grown on a growth substrate 1211; and an electrode layer 1213, including a P electrode 1213-2 and an N electrode 1213-1. The P electrode 1213-2 is disposed on the p-n diode layer 1212, and the N-electrode 1213-1 is disposed on the growth substrate 1211.

The p-n diode layer 1212 may include a composite substrate having a band gap corresponding to a particular region in the spectrum. For example, p-n diode layer 1212 may include one or more layers based on II-VI materials (e.g., ZnSe) or III-V nitride materials (e.g., GaN, AlN, InN, and alloys thereof). The growth substrate 1211 may include any suitable substrate, such as but not limited to, silicon, SiC, GaAs/GaN, and sapphire ($Al_2O_3$).

In a specific embodiment, the growth substrate 1211 may be sapphire, and the p-n diode layer is formed of GaN, but the present disclosure is not limited thereto. Despite the fact that the sapphire has a larger lattice constant than the GaN and a thermal expansion coefficient not matching, sapphire is reasonably low cost, widely available, and its transparency is compatible with a lift technique based on excimer laser. In another embodiment, another material, such as SiC, may be used as a growth substrate for the GaN p-n diode layer. Similar to the sapphire, the SiC substrate can be light transmitting. Several growth techniques, such as Metal-organic Chemical Vapor Deposition (MOCVD) can be used to grow a p-n diode layer.

The GaN-based light emitting diodes (LEDs) prepare current GaN-based LED devices on foreign substrate materials through heterogeneous epitaxial growth techniques. A typical wafer-level LED device structure may include forming a lower n-doped GaN layer over a sapphire growth substrate, a single quantum well (SWQ), or a multiple quantum well (MWQ) and an upper p-doped GaN layer.

The wafer-level LED device structure is patterned into a mesa array on the sapphire growth substrate by etching an upper p-doped GaN layer, a quantum well layer to form a n-doped GaN layer. The upper P electrode is formed on a top p-doped GaN surface of the mesa array, and the N electrode is formed on a portion of the n-doped GaN layer in contact with the mesa array. The n-doped GaN may similarly be doped with a donor, such as silicon, while the p-doped layer may be doped with a receptor, such as magnesium. A variety of alternative p-n diode configurations may be used to form the p-n diode layer. Similarly, a variety of single quantum well or multiple quantum well configurations can be used to form quantum wells. In addition, various buffer layers may be included depending on the situation.

In one embodiment, the sapphire growth substrate has a thickness of approximately 200 μm, the n-doped layer has a thickness of approximately 0.1 μm-3 μm, the quantum well layer has a thickness of less than approximately 0.3 μm, and the p-doped layer has a thickness of approximately 0.1 μm-1 μm. However, the present disclosure is not limited to this.

In the embodiment shown in FIG. 2, the p-n diode layer 1212 may be stacked from bottom to top to include a n-GaN layer, an InGaN/GaN MQW layer, a p-GaN layer, and a ZnO:Ga(GZO) layer. The electrode layer 1213 may include P electrodes and N electrodes. The P electrode may include Ti or Au, and the N electrode may include Ti or Ni or Al. However, the present disclosure is not limited to this.

Continuing to refer to FIG. 2, the LED 121 may further include: a wire grid 1214 disposed over the p-n diode layer 1212.

In the embodiment of the present disclosure, the wire grid 1214 may be a nanowire grid (also called as a Wire Grid Polarizer, WGP for short), which has a polarization function. However, the present disclosure is not limited thereto, and it may also be other polarizing plates having a polarization function. In one embodiment, the nanowire grid is over the p-n diode layer 1212 and it is in the same layer as the P electrode.

The WGP is composed of parallel metal lines whose cross-sections are of nanometer size and whose length is of macroscopic magnitude, and capable of polarizing the light. By using a metal wire grid integrated in the base substrate and replacing the polarizing plate additionally attached to the base substrate, the thickness of the device can be reduced to improve product performance.

Specifically, the preparation of the metal wire grid can use high-precision lithography or nanoimprint technology.

In the embodiment of the present disclosure, the LED 121 may be a micro LED, which refers to a miniature LED. The distance between the pixel points of the micro LED is reduced to a micron level, and each pixel can be addressed and driven to be lit up individually. The micro LED array can constitute a display by using following manners. A base substrate uses such as a glass substrate; a chip integrated with an LED array is transferred to the glass substrate by a transfer method after its growth is completed; each LED has a nanowire grid thereon, and has a polarization function. However, the present disclosure is not limited thereto. For example, an LED may be grown directly on the array substrate of the display or a thin film transistor (TFT) may be manufactured on the epitaxial wafer on which the LED is formed. Compared with LCD (Liquid Crystal Display) display, the micro LED has the advantages of fast response and easy control.

The Micro LED technology refers to a technology that integrates an array of high-density LEDs (Light Emitting Diodes) in a micro size, and it can reduce the distance between the pixel points from a millimeter level to a micrometer level when applied to the display field. Compared with other micro display technologies, the type of display device can emit light by its own and has a simple optical system, which may reduce the volume, weight, and cost of the overall system, and also combines with the characteristics of low power consumption and rapid response.

As used herein, the term "micro" device, "micro" p-n diode, or "micro" LED structure may refer to descriptive dimensions of certain devices or structures in accordance with embodiments of the present disclosure. As used herein, the term "micro" device or structure is meant to refer to a scale of 1 to 100 microns. However, it will be understood that embodiments of the present disclosure are not necessarily limited thereto, and certain aspects of the embodiments may be applied to larger and possibly smaller size scales.

In some embodiments, the micro LED array has a pitch of 10 micron by 10 micron pitch or 5 micron by 5 micron. At these densities, for example, a 6 inch substrate can accommodate approximately 165 million micro LED structures having a pitch of 10 micron by 10 micron or approximately 660 million micro LED structures having a pitch of 5 micron by 5 micron.

The three-dimensional display system of the embodiment of the present disclosure, based on the WGP (Wire Grid Polarizer) and the micro LED display, can achieve better 3D experience.

In an exemplary embodiment, one LED 121 may have a plurality of wire grids 1214 of a plurality of polarization directions, and the plurality of polarization directions is different. That is, a single LED may emit polarized lights of different polarization directions. In this way, the same LED can produce polarized lights of different polarization directions. The specific number of polarization directions can be two or more, and can be flexibly configured according to specific applications. In the following description, for example, the same LED 121 has two polarization directions or four polarization directions, but the present disclosure is not limited thereto. In this way, there may be a plurality of wire grids on the same LED (for example, 2, 3, 4, 5, ..., N, N is a positive integer greater than or equal to 2), corresponding to a plurality of polarization directions, so that many people can wear different polarized glasses to view 3D images.

In an exemplary embodiment, one LED has first wire grids of a first polarization direction and second wire grids of a second polarization direction. That is, the same LED is composed of two wire grids of different polarization directions, and the two polarization directions are different. The polarized lights emitted by the LED pass through the corresponding polarized glasses and form different images of the left and right eyes.

In an exemplary embodiment, the first polarization direction is perpendicular to the second polarization direction. However, the present disclosure is not limited to this. In other embodiments, it only requires that the first polarization direction is not the same as the second polarization direction.

Figure 3:
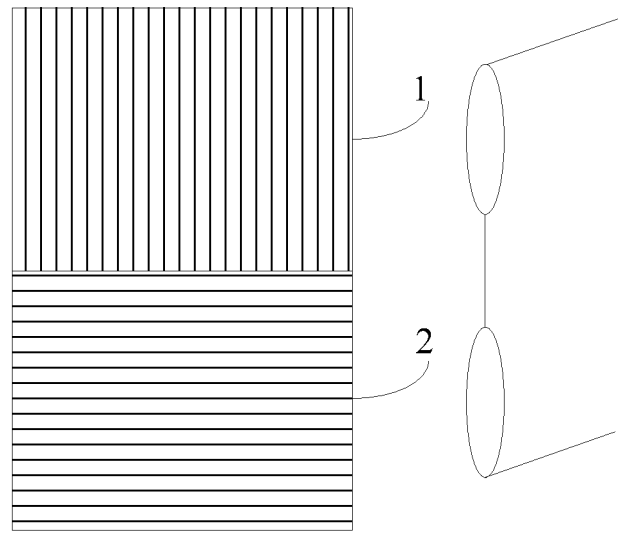
FIG. 3 shows a schematic diagram of a dual-polarized LED in an exemplary embodiment of the present disclosure.

FIG. 3 shows a schematic diagram of a dual-polarized LED in an exemplary embodiment of the present disclosure. As shown in FIG. 3, the first wire grid 1 and the second wire grid 2 are arranged one above the other.

Figure 4:
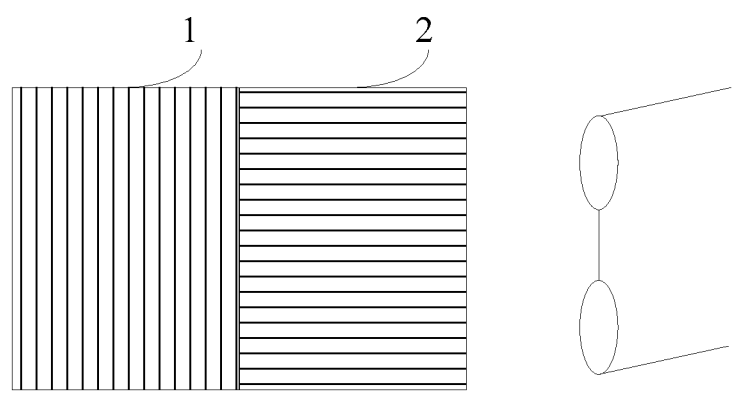
FIG. 4 shows a schematic diagram of another dual-polarized LED in an exemplary embodiment of the present disclosure.

FIG. 4 shows a schematic diagram of another dual-polarized LED in an exemplary embodiment of the present disclosure. As shown in FIG. 4, the first wire grid 1 and the second wire grid 2 are arranged horizontally.

It should be noted that the arrangement positional relationship between the first wire grid 1 and the second wire grid 2 of the dual-polarized LED is not limited to the cases shown in FIGS. 3 and 4 described above.

In an exemplary embodiment, one LED has first wire grids 1 of a first polarization direction, second wire grids 2 of a second polarization direction, third wire grids 3 of a third polarization direction, and fourth wire grids 4 of a fourth polarization direction.

Figure 5:
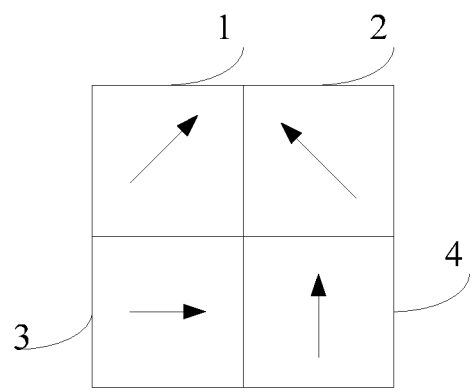
FIG. 5 shows a schematic diagram of a quad-polarized LED in an exemplary embodiment of the present disclosure.

FIG. 5 shows a schematic diagram of a quad-polarized LED in an exemplary embodiment of the present disclosure.

In the embodiment shown in FIG. 5, the first wire grid 1, the second wire grid 2, the third wire grid 3, and the fourth wire grid 4 are arranged in a matrix.

In the embodiment shown in FIG. 5, the first polarization direction is 45 degrees to the upper right, the second polarization direction is 45 degrees to the upper left, the third polarization direction is in a horizontal direction to the right, and the fourth polarization direction is in a vertical direction upward. However, the present disclosure is not limited thereto. In other embodiments, it only requires that the first polarization direction, the second polarization direction, the third polarization direction, and the fourth polarization direction are all different. As a result, polarized lights of four different polarization directions can be generated.

Figure 6:
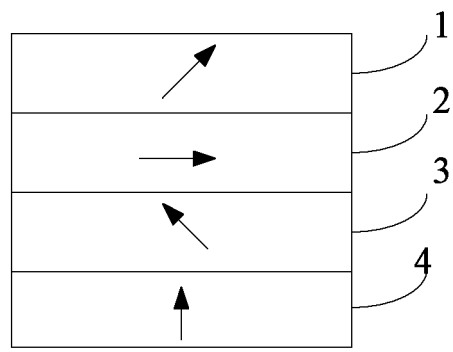
FIG. 6 shows a schematic diagram of another quad-polarized LED in an exemplary embodiment of the present disclosure.

FIG. 6 shows a schematic diagram of another quad-polarized LED in an exemplary embodiment of the present disclosure.

In the embodiment shown in FIG. 6, the first wire grid 1, the second wire grid 2, the third wire grid 3, and the fourth wire grid 4 are arranged one above the other.

In the embodiment shown in FIG. 6, the first polarization direction is 45 degrees to the upper right, the second polarization direction is in a horizontal direction to the right, the third polarization direction is 45 degrees to the upper left, and the polarization direction is in a vertical direction upward. However, the present disclosure is not limited thereto. In other embodiments, it only requires that the first polarization direction, the second polarization direction, the third polarization direction, and the fourth polarization direction are all different. As a result, polarized light of four different polarization directions can be generated.

Figure 7:
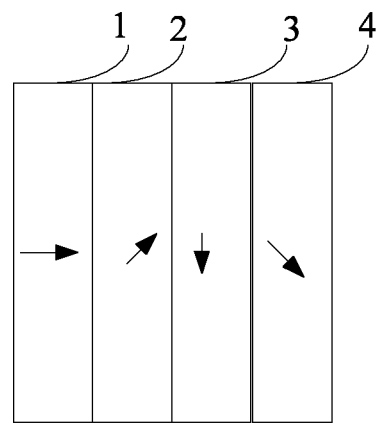
FIG. 7 shows a schematic diagram of yet another quad-polarized LED in an exemplary embodiment of the present disclosure.

FIG. 7 shows a schematic diagram of yet another quad-polarized LED in an exemplary embodiment of the present disclosure.

In the embodiment shown in FIG. 7, the first wire grid 1, the second wire grid 2, the third wire grid 3, and the fourth wire grid 4 are arranged horizontally.

In the embodiment shown in FIG. 7, the first polarization direction is in a horizontal direction to the right, the second polarization direction is 45 degrees to the upper right, the third polarization direction is in a vertical direction downward, and the fourth polarization direction is 45 degrees to the lower right. However, the present disclosure is not limited thereto. In other embodiments, it only requires that the first polarization direction, the second polarization direction, the third polarization direction, and the fourth polarization direction are all different. As a result, polarized light of four different polarization directions can be generated.

It should be noted that orientation relationships of the four polarization directions and/or the arrangement position relationships of the gratings of four different polarization directions in FIG. 5, FIG. 6 and FIG. 7 can be combined or deformed in any manner, which is not limited to the above embodiment.

In an exemplary embodiment, one LED has wire grids of one polarization direction, and the plurality of LEDs forms polarized lights of different polarization directions. That is, in addition to that one LED has wire grids of a plurality of different polarization directions described above, it may also be that different micro LEDs may be used in the LED array to respectively correspond to different polarization directions. There may also be a plurality of polarization directions (2, 3, 4, 5, ..., M), thereby enabling multiple people to wear different polarized glasses to achieve 3D display. There are many different methods for specific LED arrangements. An example of LED arrangements with four different polarization directions is as follows. However, LEDs with different polarization directions include, but are not limited to, the example in FIG. 8 described below.

Figure 8:
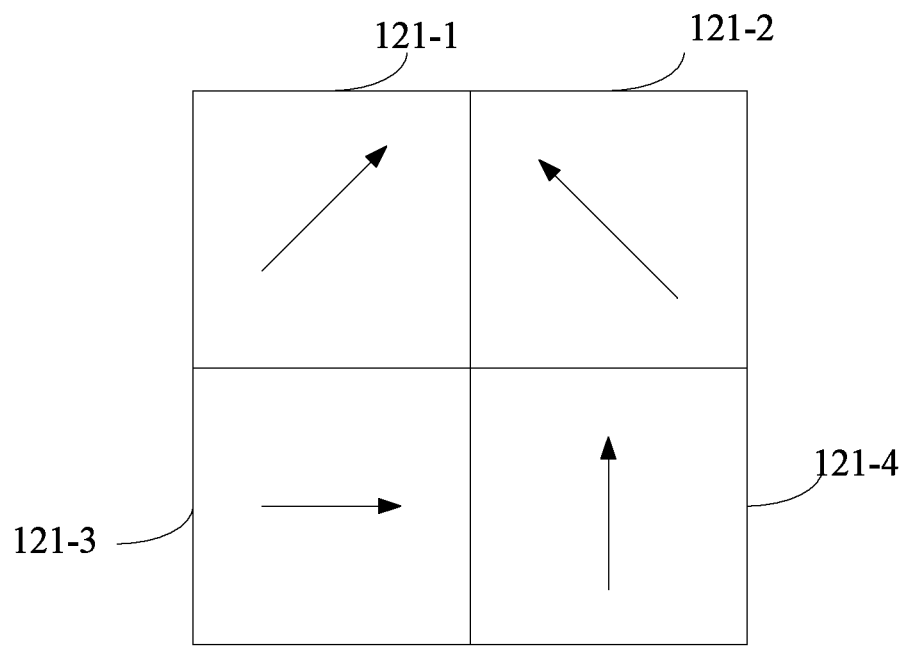
FIG. 8 shows a schematic diagram of four adjacent LEDs of different polarization directions in an exemplary embodiment of the present disclosure.

FIG. 8 shows a schematic diagram of four adjacent LEDs of different polarization directions in an exemplary embodiment of the present disclosure. For example, it is assumed that the wire grid on each LED of the adjacent first LED 121-1, second LED 121-2, third LED 121-3, and fourth LED 121-4 in the LED array has only one polarization direction. However, the polarization directions of the first to fourth LEDs are all different, so that the LED array can also generate polarized lights of four polarization directions. However, the present disclosure is not limited thereto, and it may be chosen that the polarization directions of adjacent two LEDs or adjacent three LEDs may be different, and so on. The plurality of adjacent LEDs having different polarization directions may have arbitrary suitable arrangement.

In the embodiment shown in FIG. 8, the polarization direction of the first LED 121-1 is 45 degrees to the upper right, the polarization direction of the second LED 121-2 is 45 degrees to the upper left, the polarization direction of the third LED 121-3 is in a horizontal direction to the right, and the polarization direction of the fourth LED 121-4 is in a vertical direction upward. However, the present disclosure is not limited thereto. In other embodiments, it only requires that the polarization direction of the first LED 121-1, the polarization direction of the second LED 121-2, the polarization direction of the third LED 121-3, and the polarization direction of the fourth LED 121-4 are all different.

In an exemplary embodiment, a plurality of LEDs in the LED array may also be divided into a plurality of regions, where the LEDs in different regions have different polarization directions, and the LEDs in the same region have the same polarization direction. In the embodiment, each region may include a plurality of LEDs. In this way, the LED array can also generate polarized lights of different polarization directions.

Figure 9:
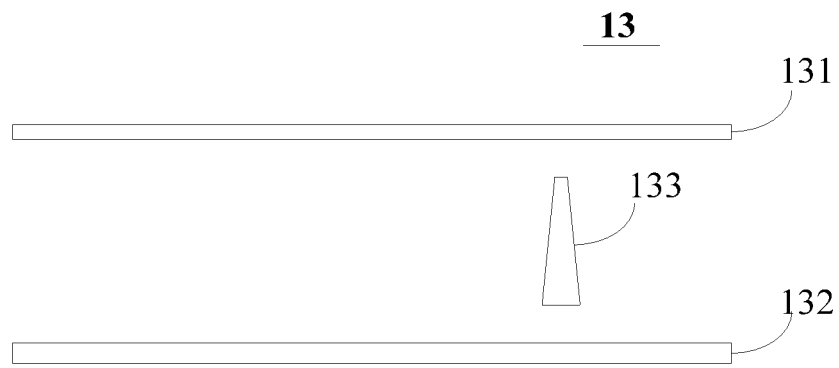
FIG. 9 shows a schematic structural diagram of a light control layer in an exemplary embodiment of the present disclosure.

FIG. 9 shows a schematic structural diagram of a light control layer in an exemplary embodiment of the present disclosure.

In an exemplary embodiment, the light control layer 13 includes a first substrate 131, a second substrate 132 and liquid crystals (not shown) disposed between the first substrate 131 and the second substrate 132. The light control layer 13 transmits light when being powered on, so that the light of the underlying LED corresponding to the transparent light control layer can be transmitted. The light control layer 13 does not transmit light when being not powered on, so that the light of the underlying LED corresponding to the opaque light control layer cannot be transmitted.

In an exemplary embodiment, the liquid crystal includes EC, i.e., an ethyl cellulose liquid crystal material, or a ferroelectric liquid crystal material. However, the present disclosure is not limited thereto, and it is also possible to use other liquid crystal materials.

In an exemplary embodiment, the light control layer 13 further includes a post spacer (PS) or a post spacer wall (PS Wall) 133 located in the liquid crystals, for controlling the liquid crystals in different regions. The post spacer or post spacer wall 133 is disposed between the first substrate and the second substrate, and separates the liquid crystals located between the first substrate 131 and the second substrate 132. For example, a post spacer or post spacer wall 133 is provided between every two adjacent pixel units, to control the liquid crystals in each pixel unit in respective region.

In an exemplary embodiment, electrodes (e.g., pixel electrodes and/or common electrodes) are deposited on the first substrate and/or the second substrate, to control the liquid crystal material between the substrates.

In the three-dimensional display system provided by the embodiments of the present disclosure, the LED array can generate polarized lights of different polarization directions, and the light control layer controls the polarized lights of different polarization directions, so that a better 3D display effect can be provided.

In some embodiments, the light control layer controls emitting of the polarized light of only one polarization direction at one time, which solves the problem of image crosstalk in the existing three-dimensional display of LCD liquid crystals.

In other embodiments, in the LED structure with polarized lights of different polarization directions provided by the embodiment of the present disclosure, one LED may be used to achieve the output of polarized lights of different polarization directions; or different LEDs may be used to achieve the output of polarized lights of different polarization directions.

Further, an embodiment of the present disclosure further provides a display device, including the three-dimensional display system as described in the above embodiments.

The display device may be any display product or part having a display function, such as a display panel, a mobile phone, a tablet computer, a television, a notebook computer, a digital photo frame, a navigator, or the like.

The display device may also include a display panel. The display panel may be a flat display panel, such as a plasma panel, an organic light emitting diode (OLED) panel, or a thin film transistor liquid crystal display (TFT LCD) panel.

The display device provided by the present disclosure includes the above-mentioned three-dimensional display system, so the same technical problems can be solved, and the same technical effects are obtained, which will not be described in detail herein.

Figure 10:
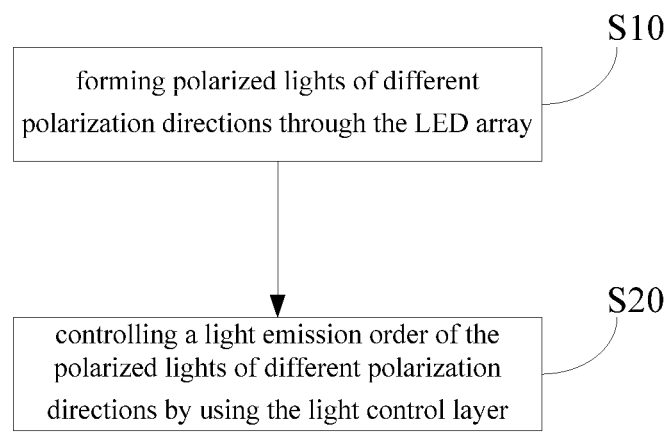
FIG. 10 shows a schematic flowchart of a three-dimensional display method in an exemplary embodiment of the present disclosure.

FIG. 10 shows a schematic flowchart of a three-dimensional display method in an exemplary embodiment of the present disclosure.

As shown in FIG. 10, the three-dimensional display method can be used in the three-dimensional display system of the above embodiment and can include following steps.

In step S10, polarized lights of different polarization directions are formed through the LED array.

In step S20, a light emission order of the polarized lights of different polarization directions is controlled by using the light control layer.

In an exemplary embodiment, the light control layer controls the polarized light of one polarization direction during a period of time.

In an exemplary embodiment, the LED array includes a plurality of LEDs, wherein each LED includes:
each LED in the LED array includes:
a p-n diode layer grown on a growth substrate;
an electrode layer disposed above the p-n diode layer;
a wire grid disposed above the p-n diode layer.

In an exemplary embodiment, one LED has a plurality of wire grids of a plurality of polarization directions, and the plurality of polarization directions is different.

In an exemplary embodiment, one LED has first wire grids of a first polarization direction and second wire grids of a second polarization direction.

In an exemplary embodiment, the controlling a light emission order of the polarized lights of different polarization directions by using the light control layer includes:

in a picture of an n-th frame, turning on a light control layer corresponding to first wire grids of the first polarization direction to transmit polarized lights corresponding to the first polarization direction, and simultaneously turning off a light control layer corresponding to second wire grids of the second polarization direction to not transmit polarized lights corresponding to the second polarization direction;

in a picture of an (n+1)-th frame, turning off the light control layer corresponding to the first wire grids of the first polarization direction to not transmit polarized lights corresponding to the first polarization direction, and simultaneously turning on the light control layer corresponding to the second wire grids of the second polarization direction to transmit the polarized lights corresponding to the second polarization direction.

Figure 11:
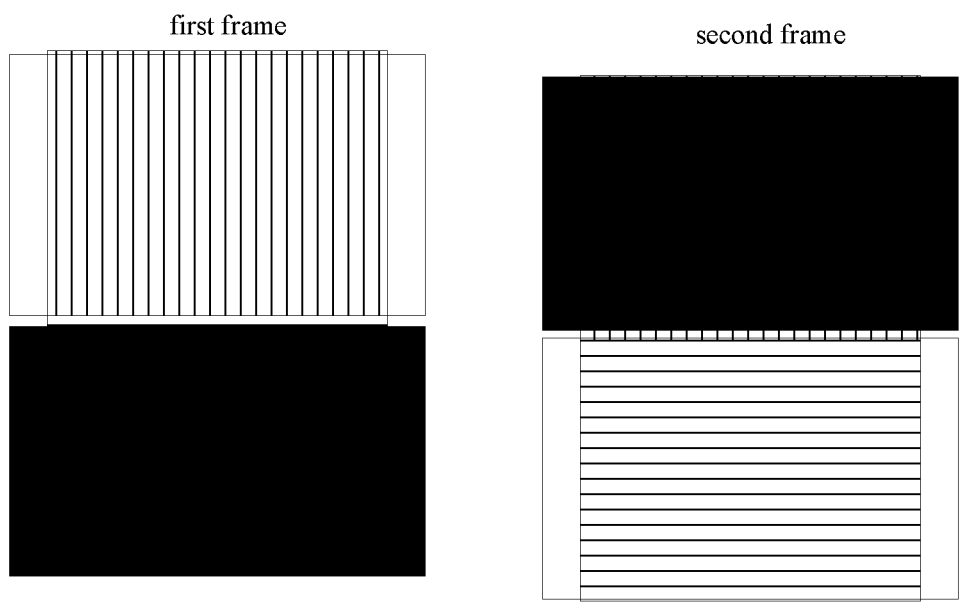
FIG. 11 shows a schematic diagram of a control method based on the dual-polarized LED shown in FIG. 3.

FIG. 11 shows a schematic diagram of a control method based on the dual-polarized LED shown in FIG. 3. As shown in FIG. 11, in the picture of the first frame, the light control layer corresponding to the polarized light of one polarization direction is turned on, to transmit one kind of polarized light, and the light control layer corresponding to the polarized light of the other polarization direction is turned off, to not transmit light. For example, the upper first grating 1 is transparent, and the lower second grating 2 is opaque. The work process of the image of the second frame is opposite to the above.

Figure 12:
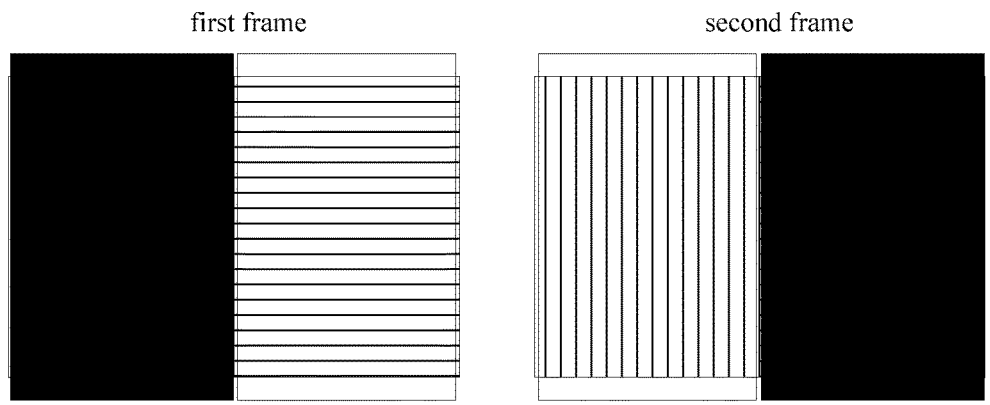
FIG. 12 shows a schematic diagram of a control method based on the dual-polarized LED shown in FIG. 4.

FIG. 12 shows a schematic diagram of a control method based on the dual-polarized LED shown in FIG. 4. As shown in FIG. 12, in the picture of the first frame, the first grating 1 on the left side is opaque, and the second grating 2 on the right side is transparent. The work process of the picture of the second frame is opposite to the above.

Figure 13:
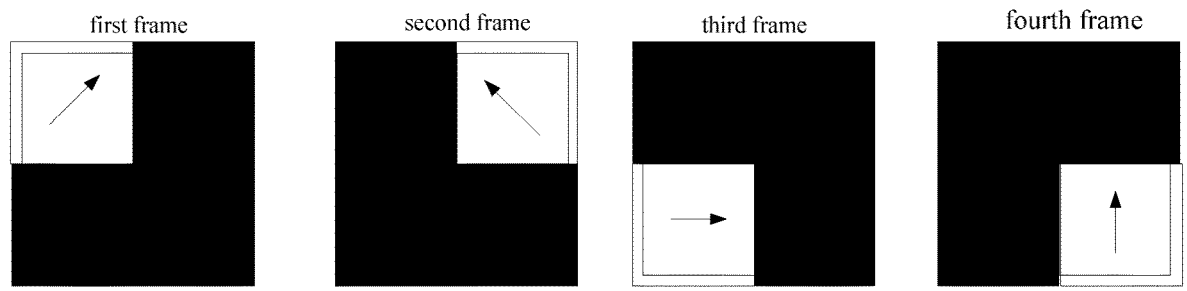
FIG. 13 shows a schematic diagram of a control method based on the quad-polarized LED shown in FIG. 5.

FIG. 13 shows a schematic diagram of a control method based on the quad-polarized LED shown in FIG. 5. As shown in FIG. 13, in the picture of the first frame, the first grating 1 in the upper left corner is transparent and the second to fourth gratings 2-4 are opaque. In the picture of the second frame, the second grating 2 in the upper right corner is transparent, and the first, third and fourth gratings 1, 3 and 4 are opaque. In the picture of the third frame, the third grating 3 in the lower left corner are transparent, and the first, second and fourth gratings are opaque. In the picture of the fourth frame, the fourth grating 4 at the lower right corner is transparent, and the first to third gratings 1 to 3 are opaque.

Figure 14:
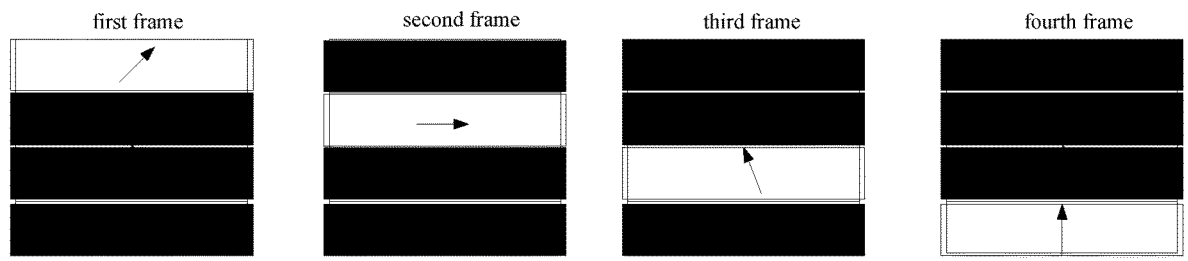
FIG. 14 shows a schematic diagram of a control method based on the quad-polarized LED shown in FIG. 6.

FIG. 14 shows a schematic diagram of a control method based on the quad-polarized LED shown in FIG. 6. As shown in FIG. 14, in the picture of the first frame, the uppermost first grating 1 is transparent, and the second to fourth gratings 2-4 are opaque. In the picture of the second frame, the second grating 2 at the second position from the top is transparent, the first, third, and fourth gratings 1, 3, and 4 are opaque. In the picture of the third frame, the third grating 3 at the third position from the top is transparent, the first, second, and fourth gratings 1, 2, and 4 are opaque. In the picture of the fourth frame, the lowermost fourth grating 4 is transparent, and the first to third gratings 1 to 3 are opaque.

Figure 15:
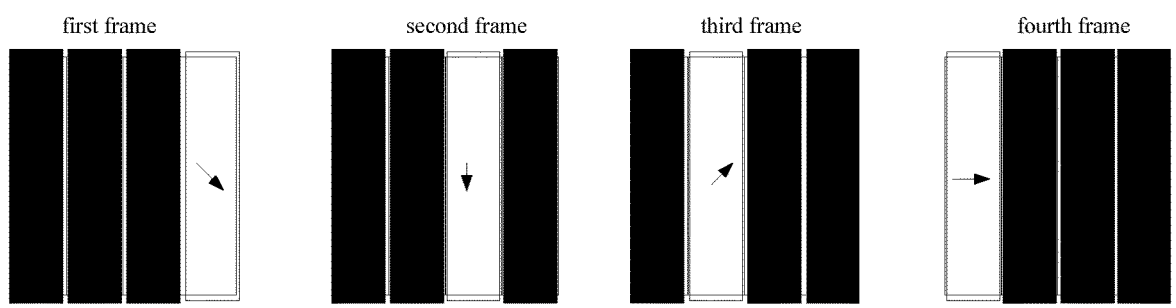
FIG. 15 shows a schematic diagram of a control method based on the quad-polarized LED shown in FIG. 7.

FIG. 15 shows a schematic diagram of a control method based on the quad-polarized LED shown in FIG. 7. As shown in FIG. 15, in the picture of the first frame, the rightmost fourth grating 4 is transparent, and the first to third gratings 1 to 3 are opaque. In the picture of the second frame, the third grating 3 at the second position from the right is transparent, the first, second, and fourth gratings 1, 2, and 4 are opaque. In the picture of the third frame, the second grating 2 at the second position from the left is transparent, the first, third, and fourth gratings 1, 3, and 4 are opaque. In the picture of the fourth frame, the leftmost fourth grating 1 is transparent, and the second to fourth gratings 2 to 4 are opaque.

In an exemplary embodiment, one LED has wire grids of one polarization direction, and a plurality of LEDs forms polarized lights of different polarization directions. The control method may refer to the manners shown in FIG. 11 to FIG. 15 described above, and details are not described herein.

In addition, the specific details of each step in the above-mentioned driving method have been described in detail in the corresponding three-dimensional display system, and therefore will not be repeated here. Moreover, although various steps of the method in the present disclosure have been described in the drawings in a specific order, this does not require or imply that these steps must be performed in this specific order, or all illustrated steps must be performed to achieve the desired result. Additionally or alternatively, some steps may be omitted, multiple steps may be combined into one step, and/or one step may be divided into multiple steps for execution.

Those skilled in the art will readily recognize other embodiments of the present disclosure upon consideration of the specification and practice of the invention disclosed herein. This application is intended to cover any variations, uses, or adaptations of the present disclosure which follow the general principles of the present disclosure and include any common knowledge or conventional techniques in this technical field not disclosed by the present disclosure. The description and examples are to be considered exemplary only, with the true scope and spirit of the present disclosure being indicated by the appended claims.

What is claimed is:

1. A three-dimensional display system, comprising an LED array and a light control layer disposed on a base substrate; wherein
the LED array is configured to form polarized lights of different polarization directions;
the light control layer is configured to control a light emission order of the polarized lights of different polarization directions, and
each LED in the LED array comprises:
a p-n diode layer grown on a growth substrate;
an electrode layer disposed above the p-n diode layer; and
a wire grid disposed above the p-n diode layer.

2. The three-dimensional display system according to claim 1, wherein the light control layer controls the polarized light of one polarization direction during a period of time.

3. The three-dimensional display system according to claim 1, wherein one LED comprises a plurality of wire grids of the plurality of polarization directions, and the plurality of polarization directions is different.

4. The three-dimensional display system according to claim 1, wherein one LED comprises first wire grids of a first polarization direction and second wire grids of a second polarization direction.

5. The three-dimensional display system according to claim 4, wherein the first polarization direction is perpendicular to the second polarization direction.

6. The three-dimensional display system according to claim 1, wherein one LED comprises first wire grids in a first polarization direction, second wire grids in a second polarization direction, third wire grids in a third polarization direction, and fourth wire grids in a fourth polarization direction, wherein the first polarization direction, the second polarization direction, the third polarization direction, and the fourth polarization direction are all different from one another.

7. The three-dimensional display system according to claim 1, wherein one LED comprises wire grids in one polarization direction, and the plurality of LEDs forms polarized lights in different polarization directions.

8. The three-dimensional display system according to claim 1, wherein the LED is a micro LED.

9. The three-dimensional display system according to claim 1, wherein the light control layer comprises a first substrate, a second substrate and liquid crystals disposed between the first substrate and the second substrate; wherein the light control layer is configured to transmit light in a power-on state and not transmit light in a power-off state.

10. The three-dimensional display system according to claim 8, wherein the light control layer further comprises a post spacer or a post spacer wall located in the liquid crystals, for controlling the liquid crystals in different regions.

11. A three-dimensional display method for the three-dimensional display system according to claim 1, wherein the method comprises:
   forming polarized lights of different polarization directions through the LED array;
   controlling a light emission order of the polarized lights of different polarization directions by using the light control layer.

12. The three-dimensional display method according to claim 11, wherein the light control layer controls the polarized light of one polarization direction during a period of time.

13. The three-dimensional display method according to claim 11, wherein the LED array comprises a plurality of LEDs, one LED has first wire grids in a first polarization direction and second wire grids in a second polarization direction, the controlling a light emission order of the polarized lights in different polarization directions by using the light control layer comprises:
   in a picture of an n-th frame, turning on a light control layer corresponding to first wire grids of the first polarization direction to transmit polarized lights corresponding to the first polarization direction, and simultaneously turning off a light control layer corresponding to second wire grids in the second polarization direction to not transmit polarized lights corresponding to the second polarization direction;
   in a picture of an (n+1)-th frame, turning off the light control layer corresponding to the first wire grids of the first polarization direction to not transmit polarized lights corresponding to the first polarization direction, and simultaneously turning on the light control layer corresponding to the second wire grids of the second polarization direction to transmit the polarized lights corresponding to the second polarization direction.

14. The three-dimensional display method according to claim 11, wherein one LED comprises wire grids of one polarization direction, and a plurality of LEDs form polarized lights of different polarization directions.

15. The three-dimensional display system according to claim 2, wherein the LED is a micro LED.

16. The three-dimensional display system according to claim 1, wherein the LED is a micro LED.

17. A three-dimensional display method for the three-dimensional display system according to claim 2, wherein the method comprises:
   forming polarized lights of different polarization directions through the LED array;
   controlling a light emission order of the polarized lights of different polarization directions by using the light control layer.

18. A three-dimensional display method for the three-dimensional display system according to claim 3, wherein the method comprises:
   forming polarized lights of different polarization directions through the LED array;
   controlling a light emission order of the polarized lights of different polarization directions by using the light control layer.

* * * * *